United States Patent
Knight et al.

[11] 3,730,143
[45] May 1, 1973

[54] HALTER FOR PIGS

[76] Inventors: Gordon Alfred Knight, Fairwinds, Drakes Broughton; Raymond Sheasby, Walcot Farm, Drakes Broughton, both of Pershore, England

[22] Filed: Mar. 5, 1971

[21] Appl. No.: 121,338

[30] Foreign Application Priority Data

Mar. 20, 1970 Great Britain......................13,662/70

[52] U.S. Cl.......................................119/130, 54/24
[51] Int. Cl.................................................A01k 25/00
[58] Field of Search ......................119/130, 96; 54/24

[56] References Cited

UNITED STATES PATENTS

| | | | |
|---|---|---|---|
| 912,703 | 2/1909 | Marshall | 119/130 |
| 1,362,505 | 12/1920 | Pierce | 119/96 |
| 1,455,445 | 5/1923 | Miner | 119/130 |
| 1,474,231 | 11/1923 | Brown | 119/130 |

FOREIGN PATENTS OR APPLICATIONS 679,654    4/1930    France

Primary Examiner—Hugh R. Chamblee
Attorney—Norris & Bateman

[57] ABSTRACT

A halter to be worn by pigs, particularly weaning sows, to restrict or prevent fighting and aggressive biting while allowing the animal to move freely and eat and drink includes a noose which can be selectively adjusted in girth when placed round the muzzle of the pig to limit opening of its jaws. Preferably the noose is formed with a slip ring. The halter further includes a collar for the pig's neck to which the noose is secured.

2 Claims, 1 Drawing Figure

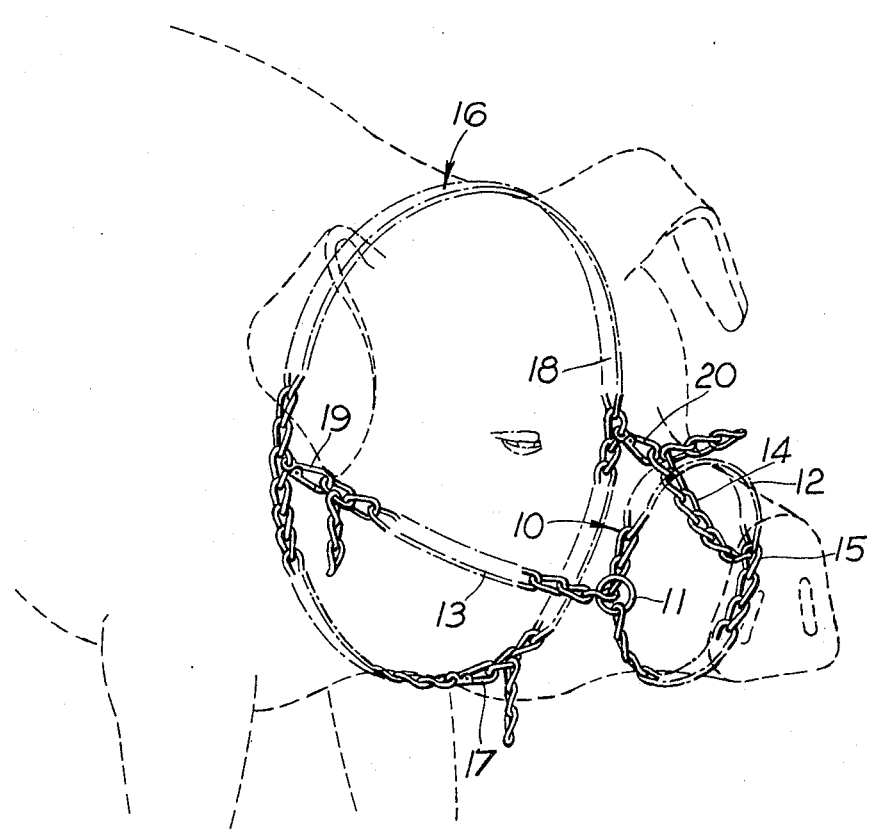

HALTER FOR PIGS

This invention relates to halters for pigs.

When a number of pigs are kept together fighting and bullying may become a problem. This is especially likely to arise where a number of sows are weaned in a confined area or pen. When a pig becomes aggressive the main injuries to other animals are caused by biting.

The object of the invention is to provide a simple and readily adjusted halter which when worn by a pig prevents or restrains it from biting aggressively though permitting it to eat and drink and move about freely.

According to the invention a halter is characterised by a muzzle band for operatively forming a noose which is selectively adjustable in effective girth for engagement around a pig's muzzle to limit opening of the pig's jaws, neck band for operatively forming a collar releasably engageable around the pig's neck, and at least one retaining piece for operatively interconnecting said collar and noose to retain the latter in place.

A preferred embodiment of the invention is now more particularly described with reference to the accompanying drawing showing a halter worn by a pig.

The halter is adjustable to fit a range of sizes of pig and is formed almost entirely from steel chain of the commonly known kind in which each link is twisted through 90° so that the adjacent links lie uniformly.

A chain muzzle band 10 terminates at one end in a circular slip ring 11 through which the other end portion of said band is passed to form a noose 12. The surplus part of the said other end portion serves as a first retaining piece 13 and a second retaining piece in the form of a chain tie 14 is attached to a link 15 approximately one quarter of the length of band 10 away from slip ring 11.

A chain neck band 16 is provided with a standard spring snap shackle 17 at one end which can be engaged with a link thereof to form a collar 18 which can be selectively adjusted in girth. A pair of retaining piece spring snap shackles 19, 20 are mounted on respective intermediate links of neck band 16 at positions approximatele one quarter of the length of that band from respective ends thereof.

In use the collar 18 is secured around the neck of a pig with the retaining piece shackles 19, 20 adjacent to respective cheeks on each side of the pig's head. The noose 12 is placed around the snout and lower jaw of the pig and is adjusted in girth by means of the slip ring 16 so that the pig is able to open its jaws only by about 2 or 3 inches. The two retaining pieces 13, 14 are led back towards the collar 18 and appropriate links thereof are attached to the respective retaining piece shackles 19, 20 in order to secure the noose on the animal's muzzle.

When the pig is wearing the halter adjusted as described above it can eat and drink, movement is unimpaired but it is unable to open its jaws by the 8 or 9 inches necessary for effectively injuring other animals by biting.

The jaw openings referred to are those of an average fully grown animal but the exact adjustment necessary for effective discouragement or prevention of fighting can be readily determined for a particular animal and the halter is readily adjusted in size to suit all types of pig.

The halter may also be of use in reducing damage to pens, troughs, etc., by pigs with biting habits and may be used for temporary securing, handling or leading of the pig.

While the above described embodiment is formed from chain, some or all of the parts of the halter may be formed from rope, cord, straps or webbing; and the adjustable engagement means may comprise hooks and eyes, buckles or other releasable securing devices instead of spring shackles. It is also contemplated that one of said engagement means, e.g. a spring shackle, might serve both to secure the collar and attach one of the retaining pieces thereto, another retaining means being provided on a diametrally opposite part of the collar to receive the other retaining piece, e.g. a further spring shackle substantially half way along the length of chain forming the collar. Alternatively engagement means may be carried on the muzzle band for releasable and adjustable engagement with a retaining piece or pieces carried on the neck band.

What we claim is:

1. A halter comprising:
   a. a muzzle band (10) having an eye (11) to form a running noose (12) in the band;
   b. a neck band (16) adapted at one end for detachable connection to itself to provide a collar (18) of selected girth and also adapted for detachable connection to a selected length (13) of a part of the muzzle band surplus to the noose in use, which length operatively serves as a first retaining piece;
   c. a tie (14) fastened to one of the bands for operatively serving as a second retaining piece; and
   d. means (20) fastened to the other of the bands to provide a detachable connection with a selected length of the tie.

2. A halter according to claim 1 characterised in that at least one of the bands (10 ; 16) is formed from chain.

* * * * *